United States Patent [19]
Hopkins et al.

[11] 4,149,607
[45] Apr. 17, 1979

[54] SUPPORT LINK ADJUSTMENT MEANS

[75] Inventors: Michael F. Hopkins, Naperville; Rodger L. Moring, Bristol, both of Ill.

[73] Assignee: Caterpillar Tractor Co., Peoria, Ill.

[21] Appl. No.: 837,963

[22] Filed: Sep. 29, 1977

[51] Int. Cl.² ............................................. B60K 17/34
[52] U.S. Cl. ................................. 180/70 R; 74/571 M; 180/51; 180/64 R
[58] Field of Search .................... 180/51, 52, 49, 44 R, 180/64 R, 70 R, 70 P; 74/571 M, 571 L, 571 R; 280/661; 248/2, 3

[56] References Cited
U.S. PATENT DOCUMENTS

| | | | |
|---|---|---|---|
| 1,913,935 | 6/1933 | Lee | 180/64 R |
| 2,149,353 | 3/1939 | Lentz | 74/571 R |
| 3,270,829 | 9/1966 | Steiger | 180/51 |
| 3,357,661 | 12/1967 | Aakjar | 280/661 |
| 3,880,444 | 4/1975 | Bridges | 280/661 |
| 4,039,038 | 8/1977 | Wilhelm | 180/70 R |

Primary Examiner—John P. Silverstrim
Attorney, Agent, or Firm—Wegner, Stellman, McCord, Wiles & Wood

[57] ABSTRACT

A stabilizer for stabilizing a drive carried on a frame. The stabilizer includes a stiffener element which is connected between a portion of the frame and the drive. The stiffener element is connected by means of an eccentric connector which is adjustably secured to provide an effective length of the stabilizer for positively securing the drive to the frame portion. A pair of such eccentrics may be provided at opposite ends of the stiffener element for further adjustability of the stabilizer.

7 Claims, 5 Drawing Figures

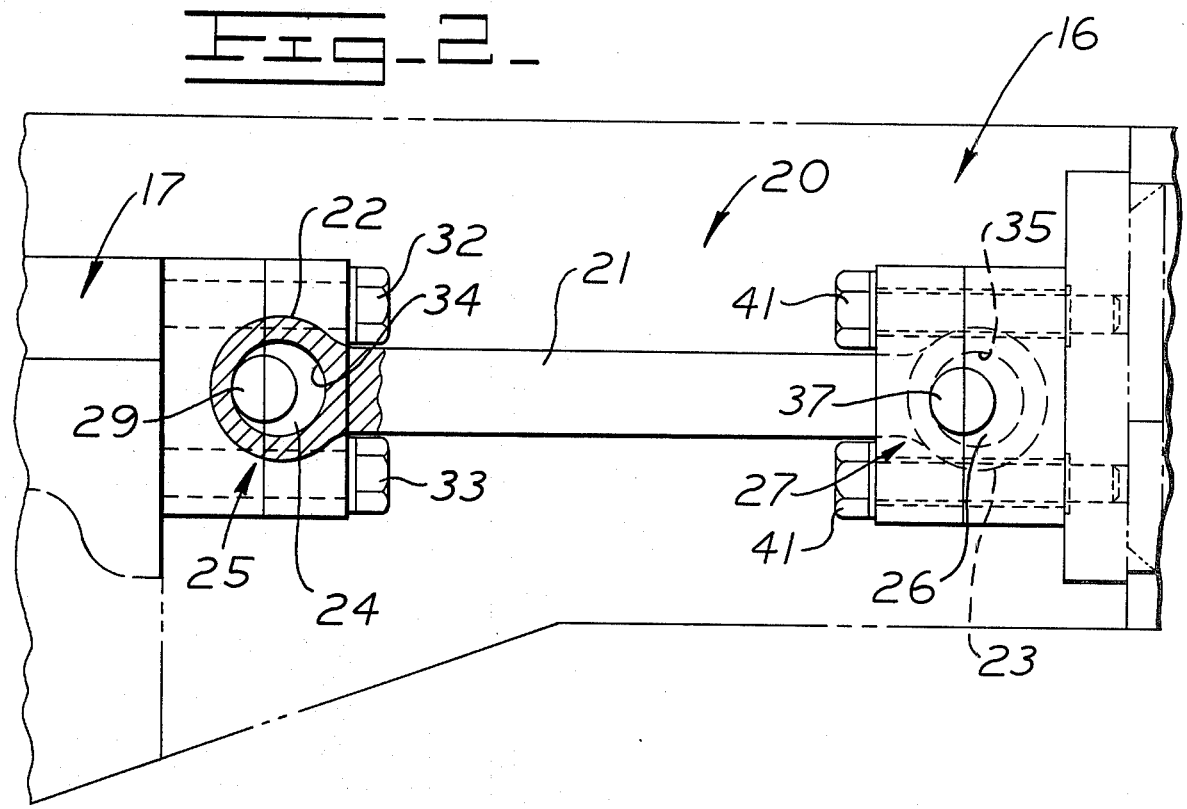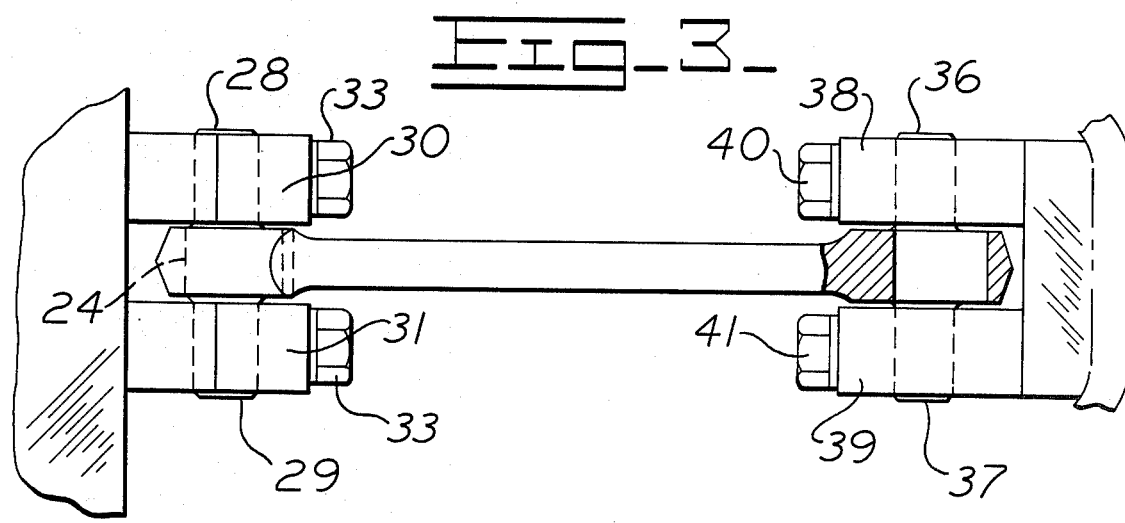

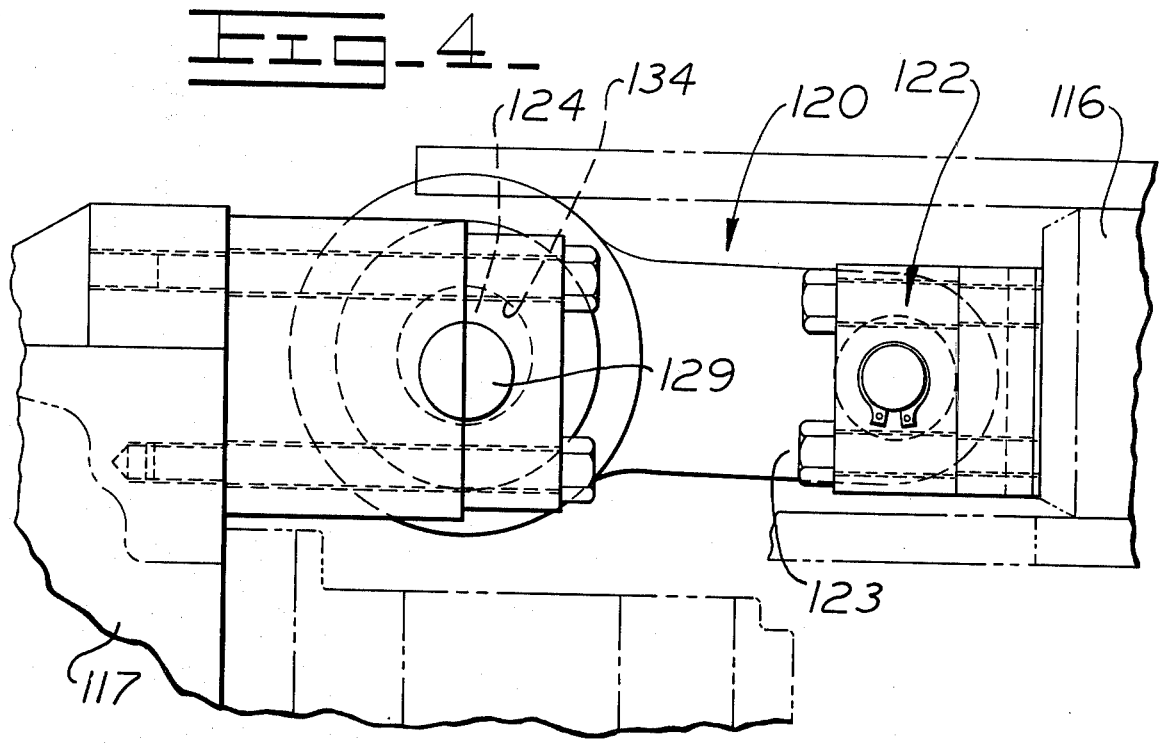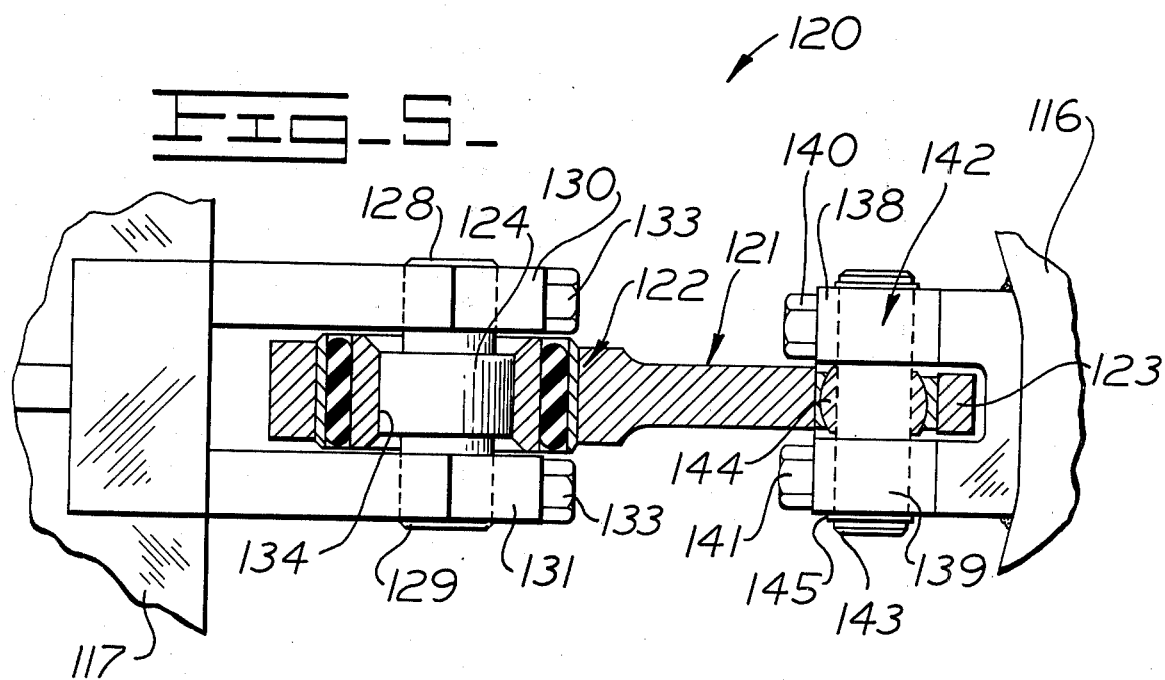

SUPPORT LINK ADJUSTMENT MEANS

BACKGROUND OF THE INVENTION

1. Field of the Invention

This invention relates to drive mounting means and in particular to means for stabilizing a drive mounted on a frame.

2. Description of the Prior Art

In a number of prior art applications, a drive is mounted on a frame for operating associated apparatus. Depending on the apparatus being driven, substantial vibration may occur in the operation of the drive. Such vibration is particularly vexatious relative to housings of different components of the drive. To stabilize such housings, it has been conventional to provide some restraining means.

As the restraining means must accommodate substantial forces in preventing the undesirable vibration, it is necessary to rigidly secure the stabilizing means as between the housings or other drive components, and supporting portions of the frame.

A number of different devices have been developed for securing such stabilizing means to the drive components and frame. A problem arises in the provision of such stabilizing devices in that they must be able to accommodate a variation in the disposition of the drive component relative to the frame resulting from different tolerances in the assembly. It has been conventional to provide shims for accommodating such variations.

SUMMARY OF THE INVENTION

The present invention is directed to overcoming one or more of the problems as set forth above.

The present invention comprehends an improved stabilizing means for stabilizing a drive relative to a supporting frame which is extremely simple and economical of construction while yet providing effectively positive stabilizing of the drive components connected thereby to the frame.

More specifically, the present invention comprehends the provision of a stiffener element with connector means at opposite ends thereof for connection respectively to the drive component and frame. At least one of the connecting means comprises an eccentric connector and securing means for adjustably securing the eccentric connector in any one of a plurality of different arrangements to adjust the effective length of the stabilizing means for positively securing the drive components to the frame.

In the illustrated embodiment, an eccentric connector is provided at each end of the stiffener element for facilitated adjustment of the stabilizing means length.

In the illustrated embodiment, the portion of the frame to which the stabilizing means is connected is spaced substantially from the portion supporting the drive means and, more specifically, comprises an upper portion of the frame spaced substantially above a lower portion of the frame on which the drive means is carried.

The eccentric connector may comprise an eccentric cam rotatably carried on the frame and a cooperating cam follower surface on the stiffener element. In the illustrated embodiment, the stiffener element comprises a link having a female cam follower surface defined by a through bore through an end of the link.

The cam follower surface may be cylindrical and the cam may be cylindrical with a pivotal mounting portion adapted to be mounted on the frame for rotation about an axis spaced from the cylindrical axis of the cam with the cam bearing against the cam follower cylindrical surface.

The cam may be secured in the adjusted position by clamping means.

The clamping means may be fixedly secured in the adjusted clamping disposition by suitable threaded securing means, such as bolts.

BRIEF DESCRIPTION OF THE DRAWING

Other features and advantages of the invention will be apparent from the following description taken in connection with the accompanying drawing wherein:

FIG. 2 is a fragmentary enlarged side elevation illustrating in greater detail the stabilizing means;

FIG. 3 is a fragmentary top plan view of the stabilizing means;

FIG. 4 is a fragmentary side elevation of a modified form of stabilizing means embodying the invention; and FIG. 5 is a fragmentary top plan view thereof with portions shown in section to facilitate illustration of the invention.

DESCRIPTION OF THE PREFERRED EMBODIMENTS

Figure 1:
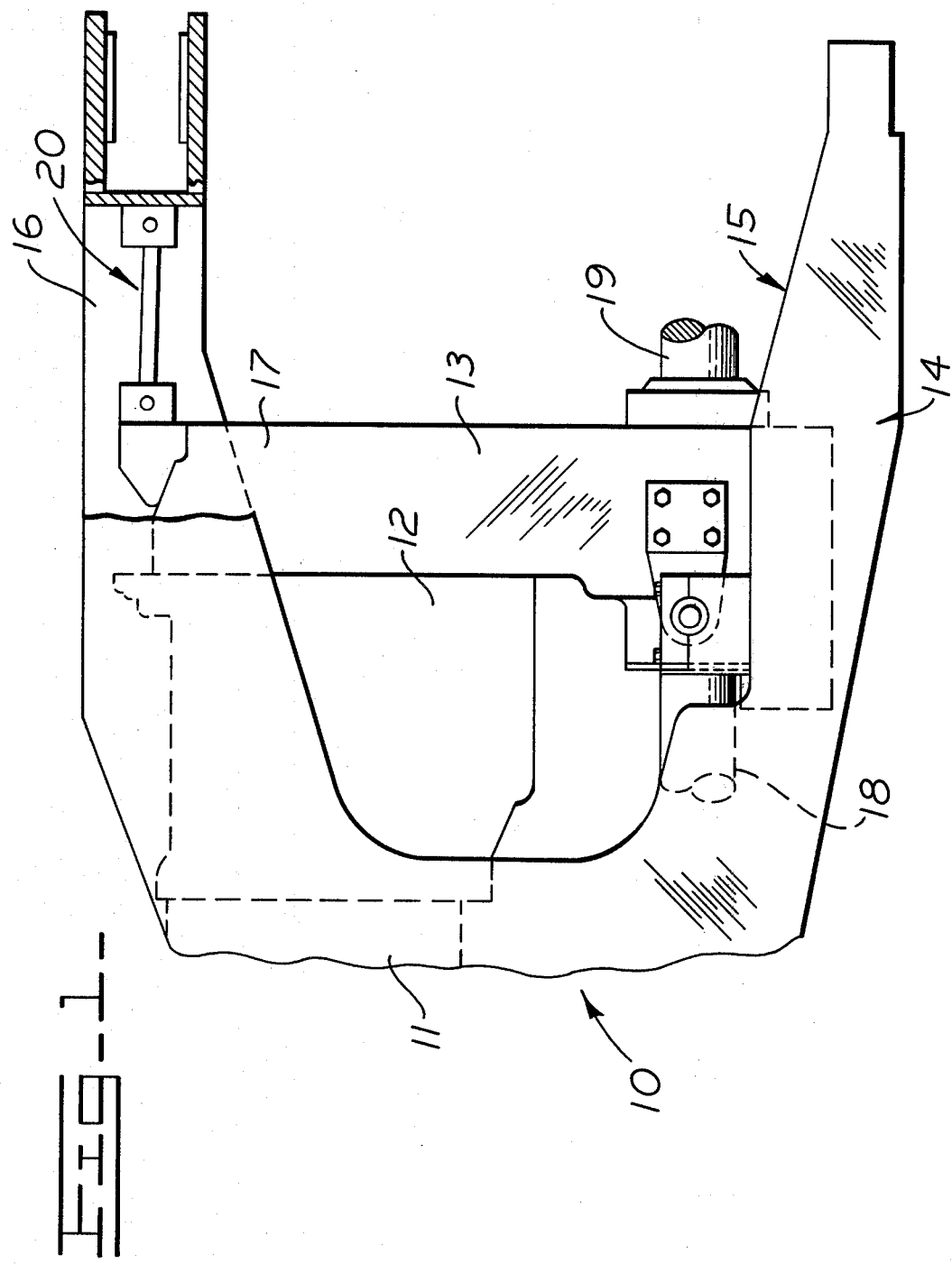
FIG. 1 is a fragmentary side elevation of a drive mounted on a frame with stabilizing means embodying the invention stabilizing the drive relative to the frame.

In the exemplary embodiment of the invention as disclosed in the drawing, a drive generally designated 10 is shown to include an engine 11 driving a transmission 12 and a transfer gear case 13. The drive is supported on a lower portion 14 of a frame generally designated 15. The frame includes an upper portion 16 spaced above the lower portion 14 and disposed adjacent an upper portion 17 of the transfer gear case 13.

The drive may further include output drive shafts, such as rear wheel shaft 18 and front wheel shaft 19.

The invention comprehends the provision of an improved stabilizing means generally designated 20 connected between the upper portion 17 of the transfer gear case and the upper portion 16 of the frame for rigidly stabilizing the drive against vibration.

Referring now more specifically to FIGS. 2 and 3, the stabilizing means 20 is defined by a stiffener element 21 which may comprise a rigid link having a first end 22 and an opposite, second end 23. End 22 cooperates with a cam 24 to define a connector generally designated 25 for connecting the stiffener element 21 to the transfer gear case portion 17.

The other end 23 cooperates with a second cam 26 to define a second connector 27 for securing the other end of the stiffener element 21 to the frame portion 16.

More specifically, cam 24 comprises a cylindrical cam provided with oppositely outwardly extending pivot pin portions 28 and 29 pivotally mounted in a pair of mounting blocks 30 and 31, respectively. Each of the mounting blocks comprises a pair of clamping blocks which may be secured about the respective pivot pins 28 and 29 by means of suitable bolts 32 and 33, respectively.

Link end 22 includes a cylindrical bore 34 which defines a cylindrical cam follower surface engaged by the cylindrical cam 24. Cam 24 is substantially complementary to bore 34 so as to slidably rotate within the bore as the result of rotation of the pivot pins 28 and 29 in the respective mounting blocks as to the adjusted position of FIGS. 2 and 3.

Connector 27 is generally similar to connector 25 in that link end 23 is provided with a cylindrical bore 35 receiving the cylindrical cam 26 having opposed pivot pin portions 36 and 37 adjustably rotatably clamped in the split mounting blocks 38 and 39. Bolts 40 and 41 are provided for locking the cam in the adjusted position.

Bolts 32 and 33 secure the end 22 of link 21 to the transfer gear case portion 17 and bolts 40 and 41 secure the end 23 of link 21 to the upper portion 16 of the frame. Adjustment of the pins 29 and 37 prior to the tightening of the bolts 32, 33, 40 and 41 may be readily effected so as to readily and accurately adjust the effective length of the stabilizing means 20 to provide a rigid interconnection between the drive portion 17 and frame portion 16.

In the event of shifting of the drive on the frame portion 14 requiring readjustment of the effective length of the stabilizing means, such readjustment may be readily effected by suitable loosening of either or both sets of bolts and readjustment of either or both of the cams 24 and 26, as desired. The adjustment is effected by the simple rotation of the cams on the pivot portions 28,29 and 36,37 respectively, and thus the adjustment is readily and effectively made without the need for shim packs and the like.

Referring now to FIGS. 4 and 5, a modified form of stabilizing means generally designated 120 embodying the invention, is illustrated wherein the end 123 of the link 121 is mounted to the frame portion 116 by a ball pivot 142 secured to the frame portion 116 by means of blocks 138 and 139 and securing bolts 140 and 141, respectively.

The ball joint connector includes a mounting pin 143 carrying the ball joint 144 and locked against axial displacement in the mounting blocks 138,139 by a suitable split locking ring 145.

The other end 122 of the stiffener element 121 defines cylindrical bore 134 receiving a complementary cylindrical cam 124 eccentrically carried on opposed pivot pins 128 and 129, respectively, rotatably carried in mounting blocks 130 and 131 secured to drive portion 117 by suitable mounting bolts 133.

Thus, the stabilizing means 120 is generally similar to stabilizing means 20 except that only one eccentric cam means is provided with one end of the stiffening element being mounted by effectively universal ball joint means to accommodate displacement between the frame portion and drive portion but with the adjustment of the effective length of the stiffening means being effected by the single eccentric cam structure.

Each of the stabilizing means disclosed herein provides an improved stabilization of a drive carried on a frame so as to effectively minimize undesirable vibration and noise in the operation of the drive. The stabilizing means of each of the embodiments is extremely simple and economical of construction while yet providing the improved stabilizing functioning in a simple, facilitated manner.

The foregoing disclosure of specific embodiments is illustrative of the broad inventive concepts comprehended by the invention.

The embodiments of the invention in which an exclusive property or privilege is claimed are defined as follows:

1. In an apparatus having a frame and drive means having a first portion mounted to a first portion of said frame, improved stabilizing means for stabilizing the drive means relative to the frame comprising:
   a stiffener element;
   first connecting means for connecting the stiffener element to a second portion of the drive means spaced from said first portion of the drive means; and
   second connecting means for connecting the stiffener element to a second portion of said frame spaced from said first portion, at least one of said connecting means comprising an eccentric connector and securing means for adjustably securing the eccentric connector in any one of an infinite plurality of different arrangements to infinitely adjust the effective length of said stabilizing means for positively securing said drive means to said second portion of the frame, said eccentric connector comprising a pin provided with a cylindrical cam defining an axis spaced from the axis of the pin and received rotatably in a complementary cylindrical cam follower, and said securing means comprising infinitely adjustable means for clamping said pin in rotatably adjusted position.

2. The apparatus of claim 1 wherein said second portion of the drive means is spaced above said first portion of the drive means.

3. The apparatus of claim 1 wherein said stiffener element comprises a link, and said cam follower is provided on said link.

4. The apparatus of claim 1 wherein said securing means includes threaded means.

5. In an apparatus having a frame and drive means having a first portion mounted to a first portion of said frame, improved stabilizing means for stabilizing the drive means relative to the frame comprising:
   a stiffener element;
   first connecting means for connecting the stiffener element to a second portion of the drive means spaced from said first portion of the drive means; and
   second connecting means for connecting the stiffener element to a second portion of said frame spaced from said first portion, one of said connecting means comprising an eccentric connector and securing means for adjustably securing the eccentric connector in any one of a plurality of different arrangements to adjust the effective length of said stabilizing means for positively securing said drive means to said second portion of the frame, the other of said connecting means comprising universal joint means.

6. The apparatus of claim 5 wherein said universal joint means comprises a ball joint.

7. The apparatus of claim 5 wherein said universal joint means comprises a ball joint including a ball element carried by one of said frame and drive means and means on said stiffener element movably receiving said ball element.

* * * * *